(12) United States Patent
Myers

(10) Patent No.: US 6,363,661 B1
(45) Date of Patent: Apr. 2, 2002

(54) PROTECTIVE COVER

(76) Inventor: Preston D. Myers, 20460 Williams, Hilmar, CA (US) 95324

( * ) Notice: Subject to any disclaimer, the term of this patent is extended or adjusted under 35 U.S.C. 154(b) by 0 days.

(21) Appl. No.: 09/685,619

(22) Filed: Oct. 10, 2000

(51) Int. Cl.[7] .............................................. E04H 15/20
(52) U.S. Cl. ........................ 52/2.13; 52/2.22; 52/2.23; 52/3
(58) Field of Search ................................ 52/2.13, 2.22, 52/2.23, 2.24, 3, 23; 4/498, 499

(56) References Cited

U.S. PATENT DOCUMENTS

| | | | | |
|---|---|---|---|---|
| 2,682,274 A | * | 6/1954 | Miller | 52/2.13 |
| 2,830,606 A | * | 4/1958 | Daugherty | 52/2.19 |
| 3,332,177 A | * | 7/1967 | Sepp | 52/2.19 |
| 3,862,876 A | | 1/1975 | Graves | |
| 4,413,029 A | | 11/1983 | Handwerker | |
| 4,580,372 A | | 4/1986 | Osborn | |
| 5,242,206 A | | 9/1993 | Heck | |
| 5,350,000 A | | 9/1994 | Wang | |
| D379,081 S | | 5/1997 | Wilson | |
| D389,451 S | | 1/1998 | Wilson | |
| 5,890,525 A | | 4/1999 | Shores | |
| 5,901,504 A | * | 5/1999 | Stoll et al. | 52/2.22 |

FOREIGN PATENT DOCUMENTS

| | | | | |
|---|---|---|---|---|
| DE | 2225784 | * | 12/1972 | 52/2.23 |
| DE | 0251909 | * | 12/1987 | 52/2.22 |
| FR | 2365978 | * | 4/1978 | 52/2.23 |

* cited by examiner

*Primary Examiner*—Beth A. Stephan
*Assistant Examiner*—Brian E. Glessner
(74) *Attorney, Agent, or Firm*—Dale J. Ream

(57) ABSTRACT

A cover for protecting a mound of particulate material in outside storage from the effects of weather elements includes a flexible double-ply canvas having a top layer affixed to a bottom layer. The cover includes a plurality of individual bladders disposed between the top and bottom layers of the canvas, the bladders being spaced apart from and parallel to each other. Each bladder is connected to a next adjacent bladder with a flexible conduit. The cover further includes a plurality of inlet conduits coupled to respective bladders for filling selected bladders with water. Pressure-actuated check valves disposed in each flexible conduit between bladders allows water to flow from an upstream bladder into respective downstream bladders. Each bladder includes a discharge conduit for selectively draining each bladder. A plurality of straps and knobs are fixedly attached to the canvas such that the canvas may be folded and secured in a desired configuration when respective bladders do not contain water.

18 Claims, 4 Drawing Sheets

PROTECTIVE COVER

BACKGROUND OF THE INVENTION

This invention relates generally to covers and, more particularly, to a flexible cover having multiple bladders for positioning the cover atop a mound of particulate material so as to protect the material from the effects of weather elements.

Particulate material, such as sand, salt, grain, or other silage, is often stored outside in open areas unprotected from weather elements such as wind and rain. These weather elements may cause erosion of the mound and ultimately result in a degradation of the material's quality as well as a loss in the mound's quantity through run-off.

Many covers have been proposed in the art for protecting either a mound of particulate material or other objects such as automobiles. Specifically, a cover for protecting particulate material is disclosed in U.S. Pat. No. 4,413,029 to which a plurality of automobile tires may be attached for maintaining the cover's position on the mound. Although assumably effective for their intended purposes, the existing devices are not easy to position or use and do not provide for being held securely in selected configurations.

Therefore, it is desirable to have a cover which can be easily spread or positioned and then easily increased in weight such that the position on the mound is maintained. Further, it is desirable to have a cover in which the weight may be easily and quickly adjusted such that the cover may be folded or reconfigured.

SUMMARY OF THE INVENTION

A cover according to the present invention includes a flexible, double-ply canvas having a top layer fixedly attached to a bottom layer. A plurality of separate bladders, each capable of containing water, are disposed between the layers and are connected with flexible conduit. Each bladder further includes an inlet conduit with a check valve such that a hose connected to a water source may be coupled to a selected inlet conduit to fill a respective bladder. A pressure-actuated check valve is disposed within each flexible conduit which enables water from an upstream bladder to flow through a respective flexible conduit into an adjacent downstream bladder. The bladders are arranged in two completely separate series, each bladder within a series being spaced apart and parallel to each of the other bladders of that series. Therefore, connecting a water source to the inlet conduit of the most upstream bladder of a series allows all of the bladders within that series to be filled as water flows from an upstream bladder to a downstream bladder through respective pressure-actuated check valves. The two series of bladders are disposed along the longitudinal edges of the canvas such that the bladders, when filled with water, provide the ballast necessary to hold the cover in position over a mound of particulate material.

The cover further includes a plurality of T-handles or knobs extending upwardly from an inner surface of the bottom canvas layer and through the top layer. A plurality of straps extends from the outer surface of the bottom layer, each strap opposite a knob. Each bladder includes a discharge conduit and as one or more bladders are drained, the canvas may be folded or rolled up. The straps corresponding to drained bladder may be coupled to appropriate knobs such that the cover may be held in a desired position. Therefore, the cover may be easily reconfigured as portions of the mound are removed.

Therefore, a general object of this invention is to provide a cover for protecting a mound of particulate material in outside storage from the effects of weather elements.

Another object of this invention is to provide a cover, as aforesaid, having a plurality of spaced apart bladders disposed between the canvas layers which may be inflated with water so as to hold the cover in a desired position upon a particulate mound.

Still another object of this invention is to provide a cover, as aforesaid, in which the plurality of bladders are connected for fluid flow such that multiple bladders may be filled from a single water source.

Yet another object of this invention is to provide a cover, as aforesaid, in which each bladder may be filled with water or drained individually.

A further object of this invention is to provide a cover, as aforesaid, which is flexible and may be folded or rolled when respective bladders have been drained.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENTS

Figure 1:
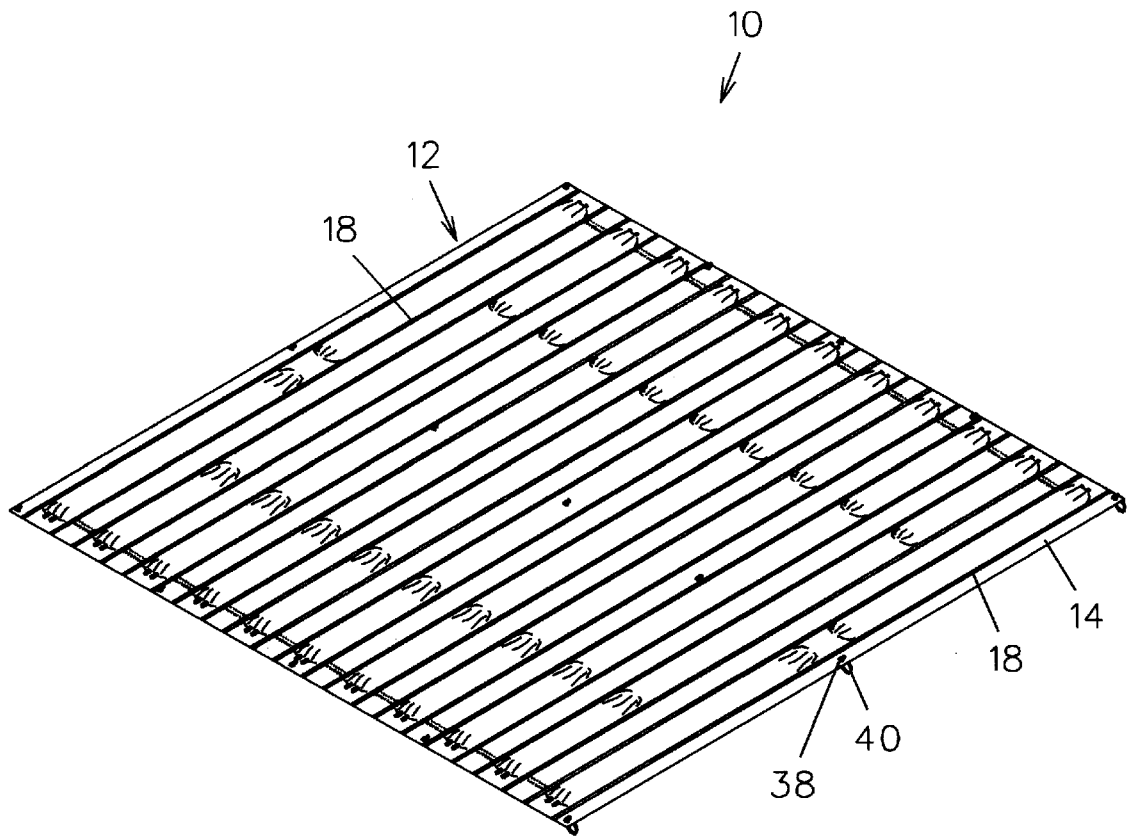
FIG. 1 is a perspective view of a cover according to the present invention.

A cover 10 according to a preferred embodiment of the present invention will now be described with reference to FIGS. 1–4 of the accompanying drawings. The cover 10 includes a generally rectangular, flexible double-ply canvas 12 having a top layer 14 fixedly attached to a bottom layer 16. The edges of the top 14 and bottom 16 layers are affixed together with stitching, although the edges may be glued together or affixed in any other suitable manner. The top 14 and bottom 16 layers further include a plurality of parallel seams 18 extending between longitudinal edges of the canvas so as to form a plurality of panels. These panels may be folded one atop another as to be described in more detail below.

Figure 2:
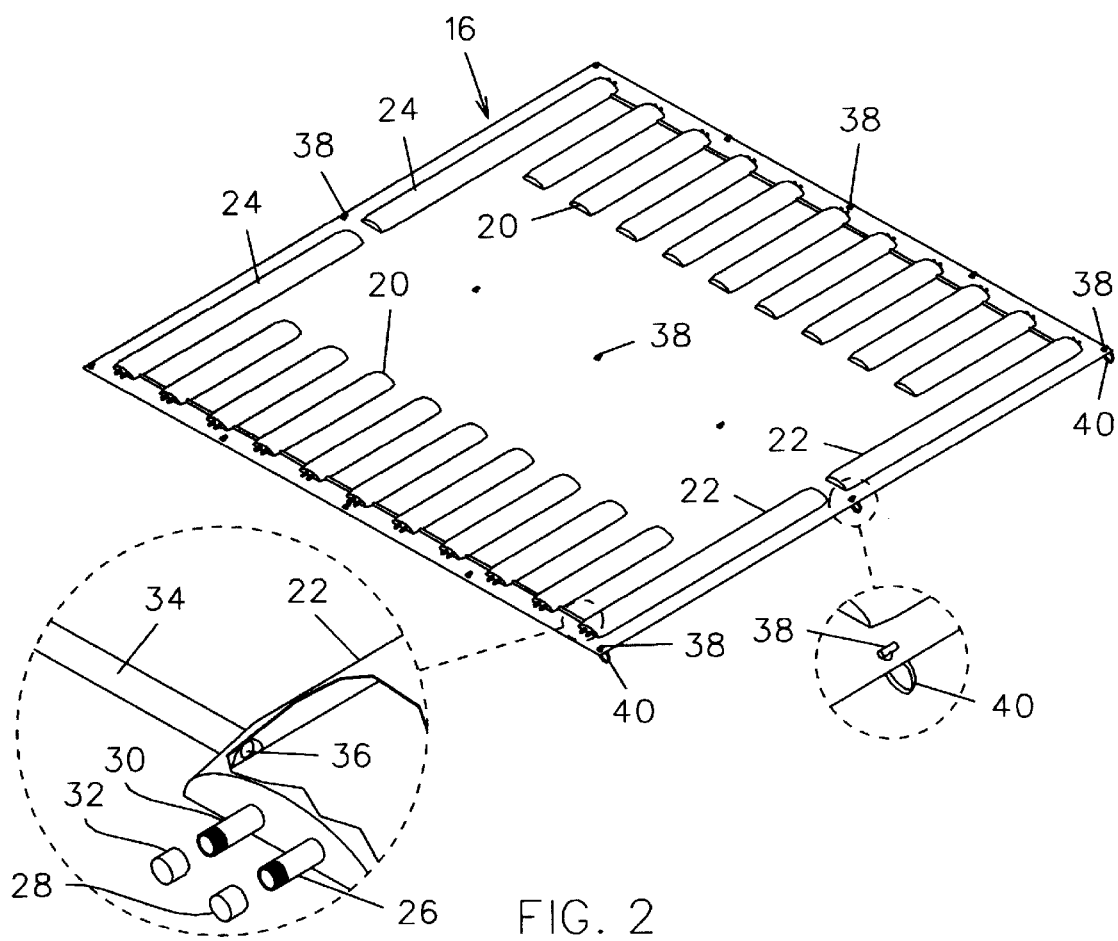
FIG. 2 is a perspective view as in FIG. 1 with the top layer of the canvas removed and having an enlarged isolated fragmentary view of a bladder assembly.
Figure 3:
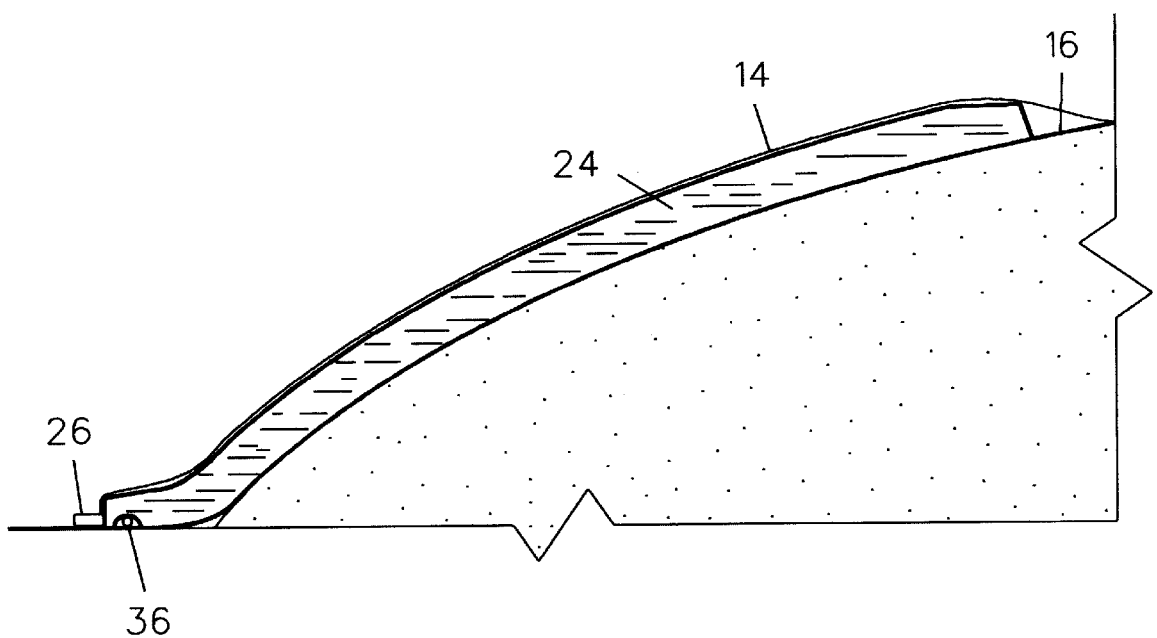
FIG. 3 is a fragmentary rear view of the cover positioned atop a particulate mound that is deposited on a ground surface.

A plurality of bladders 20 are disposed between the top 14 and bottom 16 layers of the canvas 12 and are fixedly attached thereto (FIG. 2). The bladders 20 are arranged in two series along opposed longitudinal edges of the canvas 12. Each bladder 20 includes a first end adjacent a respective longitudinal edge of the canvas 12 and a second end displaced from the respective edge. Each bladder 20 is positioned perpendicular to a respective edge of the canvas. In addition, the bladders 20 are spaced apart and parallel to each other within corresponding panels of the canvas 12. Each series of bladders includes a front bladder 22 and rear bladder 24 that each have a length greater than a length of the bladders 20 therebetween. Therefore, the weight of the bladders, when filled with water, is concentrated about the base of a mound of particulate material as no bladder extends over the top of a mound when the cover 10 is properly positioned.

The first end of each bladder 20 includes an inlet conduit 26 which protrudes through the top layer 14 of the canvas 12 (FIGS. 1 and 2). Each inlet conduit 26 includes an outwardly threaded end to which a water hose may be threadably coupled for filling the bladder with water. Each inlet conduit 26 includes a check valve (not shown) such that water is permitted to flow through the inlet conduit into the bladder but is not permitted to return therethrough. Each inlet conduit further includes a cap 28 to prevent the conduit from being filled with dirt or silage. A discharge conduit 30 extends from the first end of each bladder and through the top layer adjacent a corresponding inlet conduit 26. Each discharge conduit 30 includes a cap 32 threadably removable by a user so as to drain a selected bladder.

Each bladder 20 is connected to a next adjacent bladder with a flexible conduit 34 (FIG. 2). A pressure actuated check valve 36 is disposed within each flexible conduit 34. Accordingly, as an upstream bladder becomes filled with water, the water exerts an increasing pressure against a pressure-actuated check valve and, at a predetermined pressure, water is allowed to flow through a respective flexible conduit into a next adjacent downstream bladder. Although each bladder may be filled individually through the inlet conduits 26, all of the bladders within a series of bladders may be filled at the same time if a water source is coupled to the front bladder 22.

The cover 10 further includes a plurality of T-handles or knobs 38. Each knob 38 is fixedly attached to the inner surface of the bottom layer 16 of the canvas and extends upwardly through the top layer 14. The knobs 38 are spaced apart along the longitudinal edges of the canvas 12 as well along an imaginary longitudinal axis between the longitudinal edges (FIG. 2). A plurality of loops or straps 40 are fixedly attached to the outer surface of the bottom layer 16 of the canvas 12, each strap 40 being immediately opposite a knob 38.

Figure 4:
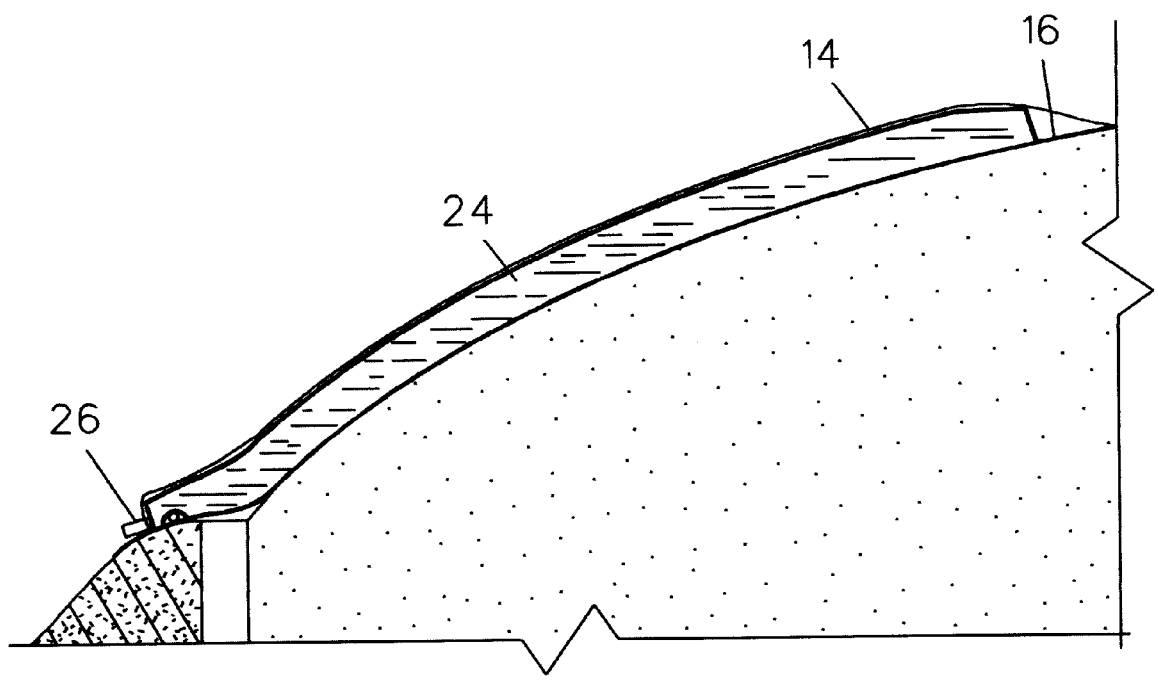
FIG. 4 is a fragmentary rear view of the cover positioned over a particulate mound that is deposited in a silage bunker.

In use, the cover 10 may be positioned atop a mound of particulate material, the mound being deposited directly on a ground surface (FIG. 3) or in a silage bunker (FIG. 4). Obviously, the cover 10 is positioned on a mound before the bladders are inflated with water for weight considerations. Upon being positioned such that the bladders are generally about the base of the mound, a hose connected to a water source is coupled to an inlet conduit 26 whereby to fill the respective bladder. As the selected bladder is filled, the corresponding pressure-actuated check valve allows water to flow into the next adjacent bladder, and so on. All of the bladders 20 of the cover 10 may be filled by connecting a water source to the front bladders 22 in turn or, alternatively, by filling each bladder individually. Of course, only selected bladders may be filled, if desired. As particulate material needs to be removed from the mound, selected bladders may be individually drained by removing selected caps 32 from respective discharge conduits and then folding the canvas panels back along the seams 18.

It should also be appreciated that when the cover 10 is utilized in colder climates or during the winter months, the bladders 20 may be inflated with a mixture of water and nontoxic propylene glycol (anti-freeze) to minimize freezing thereof. Heating coils or solar heating mechanisms would also be suitable. Minimizing the freezing of water within the bladders 20 is important so that water may be drained from selected bladders and the cover may be gradually folded back as particulate material is removed from the mound.

It is understood that while certain forms of this invention have been illustrated and described, it is not limited thereto except insofar as such limitations are included in the following claims and allowable functional equivalents thereof.

Having thus described the invention, what is claimed as new and desired to be secured by letters patent is as follows:

1. A cover for protecting a mound of particulate material in outside storage from the effects of weather elements, said cover comprising:
    a flexible canvas having a top layer connected to a bottom layer along respective side edges thereof;
    a plurality of bladders disposed between said top and bottom layers of said canvas in a spaced apart configuration, each bladder being coupled to an adjacent bladder with a flexible conduit for fluid communication therewith; and
    means including a check valve for selectively filling said plurality of bladders with water, whereby said canvas is maintained upon the mound by the weight of said bladders when filled with water.

2. A cover as in claim 1 wherein said canvas includes a generally rectangular configuration adapted to cover a mound of fodder silage.

3. A cover as in claim 1 wherein said top and bottom layers of said canvas include a plurality of panels adapted to be folded one atop another when said bladders are not filled with water.

4. A cover as in claim 3 further comprising:
    a plurality of knobs fixedly attached to an inner surface of said bottom layer of said canvas and spaced apart along a longitudinal extent of said inner surface, said plurality of knobs extending vertically through said top layer;
    a plurality of straps fixedly attached to an outer surface of said bottom layer opposite respective knobs, each strap adapted to be removably coupled to one of said knobs, whereby selected adjacent panels may be folded and maintained in a selected configuration upon a coupling of selected straps and knobs by a user when respective bladders in said selected panels are not filled with water.

5. A cover as in claim 1 further comprising:
    a plurality of knobs fixedly attached to an inner surface of said bottom layer of said canvas and spaced apart along a longitudinal extent of said inner surface, said plurality of knobs extending vertically through said top layer; and
    a plurality of straps fixedly attached to an outer surface of said bottom layer opposite respective knobs, each strap adapted to be removably coupled to a one of said knobs, whereby a selected portion of said canvas may be folded and maintained in a selected configuration upon a coupling of selected straps and knobs by a user when respective bladders disposed in said selected portion are not filled with water.

6. A cover as in claim 1 wherein said plurality of bladders includes:
    a first series of bladders, each bladder of said first series of bladders including a generally tubular configuration and being spaced apart from and parallel to an adjacent bladder of said first series of bladders, each said bladder of said first series of bladders having a first end adjacent to a first side edge of said canvas and a second end displaced from said first side edge; and
    a second series of bladders, each bladder of said second series of bladders including a generally tubular configuration and being spaced apart from and parallel to an adjacent bladder of said second series of bladders, each said bladder of said second series of bladders having a first end adjacent to a second side edge of said canvas and a second end displaced from said second side edge.

7. A cover as in claim 1 wherein each said conduit includes a pressure-actuated check valve for enabling water to flow through said conduit between an upstream bladder and an adjacent downstream bladder when water within said upstream bladder reaches a predetermined pressure relative to a respective pressure-actuated check valve.

8. A cover as in claim 1 wherein each said bladder includes a means for discharging water from said bladder.

9. A cover for protecting a mound of particulate material in outside storage from the effects of weather elements, said cover comprising:

a generally rectangular double-ply canvas having a top layer fixedly attached to a bottom layer along respective edges of said top and bottom layers;

a plurality of bladders disposed between said top and bottom layers of said canvas, each bladder being parallel to a next adjacent bladder and coupled thereto with a flexible conduit for fluid communication therewith; and means for filling said plurality of bladders with water, whereby said canvas is maintained upon the mound by the weight of said water-filled bladders.

10. A cover as in claim 9 wherein said top and bottom layers of said canvas define a plurality of panels adapted to be folded one atop another when said bladders are not filled with water.

11. A cover as in claim 10 further comprising:

a plurality of knobs fixedly attached to an inner surface of said bottom layer of said canvas and spaced apart along a longitudinal extent of said inner surface, said plurality of knobs extending vertically through said top layer;

a plurality of straps fixedly attached to an outer surface of said bottom layer opposite respective knobs, each strap adapted to be removably coupled to one of said knobs, whereby selected adjacent panels may be folded and maintained in a selected configuration upon a coupling of selected straps and knobs by a user when respective bladders in said selected panels are not filled with water.

12. A cover as in claim 9 wherein each said conduit includes a pressure-actuated check valve for enabling water to flow through said conduit between an upstream bladder and an adjacent downstream bladder when water within said upstream bladder reaches a predetermined pressure relative to a respective pressure-actuated check valve.

13. A cover as in claim 9 wherein each said bladder includes a discharge conduit for selectively draining said bladder.

14. A cover as in claim 9 wherein said filling means includes an inlet conduit adapted to be coupled to a water hose and having a check valve for preventing water received in a respective bladder from leaking therefrom.

15. A cover for protecting a mound of particulate material in outside storage from the effects of weather elements, said cover comprising:

a generally rectangular flexible double-ply canvas having a top layer fixedly attached to a bottom layer with stitching along respective edges of said top and bottom layers;

a plurality of bladders disposed between said top and bottom layers of said canvas, each bladder being parallel to a next adjacent bladder and coupled thereto with a flexible conduit for fluid communication therewith, each said flexible conduit having a pressure-actuated check valve for enabling water to flow through said conduit between an upstream bladder and an adjacent downstream bladder when water within said upstream bladder reaches a predetermined pressure relative to a respective pressure actuated check valve; and a plurality of inlet conduits, each inlet conduit having one end coupled to a respective bladder and a second end adapted to be coupled to a water hose for filling said respective bladder, each said inlet conduit having a check valve for preventing water received in a respective bladder from leaking therefrom.

16. A cover as in claim 15 wherein said top and bottom layers of said canvas include a plurality of panels adapted to be folded one atop another when said bladders are not filled with water.

17. A cover as in claim 16 further comprising:

a plurality of knobs fixedly attached to an inner surface of said bottom layer of said canvas and spaced apart along a longitudinal extent of said inner surface, said plurality of knobs extending vertically through said top layer;

a plurality of straps fixedly attached to an outer surface of said bottom layer opposite respective knobs, each strap adapted to be removably coupled to one of said knobs, whereby selected adjacent panels may be folded and maintained in a selected configuration upon a coupling of selected straps and knobs by a user when respective bladders in said selected panels are not filled with water.

18. A cover as in claim 17 wherein each said bladder includes a discharge conduit for selectively draining said bladder.

* * * * *